United States Patent Office 3,196,616
Patented July 27, 1965

3,196,616
AUTOMATIC CONTROLLING MEANS FOR SWASH PLATE TYPE PRESSURE-FLUID TRANSMISSION GEARS
Tasuku Date, Nobusuke Harada, and Noriyuki Takahashi, Tokyo, Japan, assignors to Kabushiki Kaisha Honda Gijitsu Kenkyosho, Kita Adachi-gun, Saitama Prefecture, Japan, a corporation of Japan
Filed June 5, 1963, Ser. No. 285,627
Claims priority, application Japan, June 5, 1962, 37/22,462
6 Claims. (Cl. 60—53)

This invention relates generally to pressure fluid transmission gears which comprise a rotatable, variable displacement pump and a rotatable, variable displacement motor mounted concentrically to each other, at least either the pump or the motor being of the swash plate type.

The object of this invention is to control the transmission ratio according to variations of the output torque and load on the prime mover. This is accomplished in the instant invention by rotation of the swash plate, through a suitable mechanism upon variations of the output torque and load.

It is usually well known that a pressure fluid transmission gear of swash plate type is constructed by mounting a cylindrical pump with a plurality of cylinders and pistons therein concentrically on a shaft, and then mounting a cylindrical motor with a plurality of cylinders and pistons therein concentrically on the outer periphery of the pump, as is shown in Japanese patent publication No. 6705/1958.

Further objects and advantages of the present invention will be apparent from the following description, reference being had to the accompanying drawings wherein a preferred form of the present invention is clearly shown.

Figure 1:
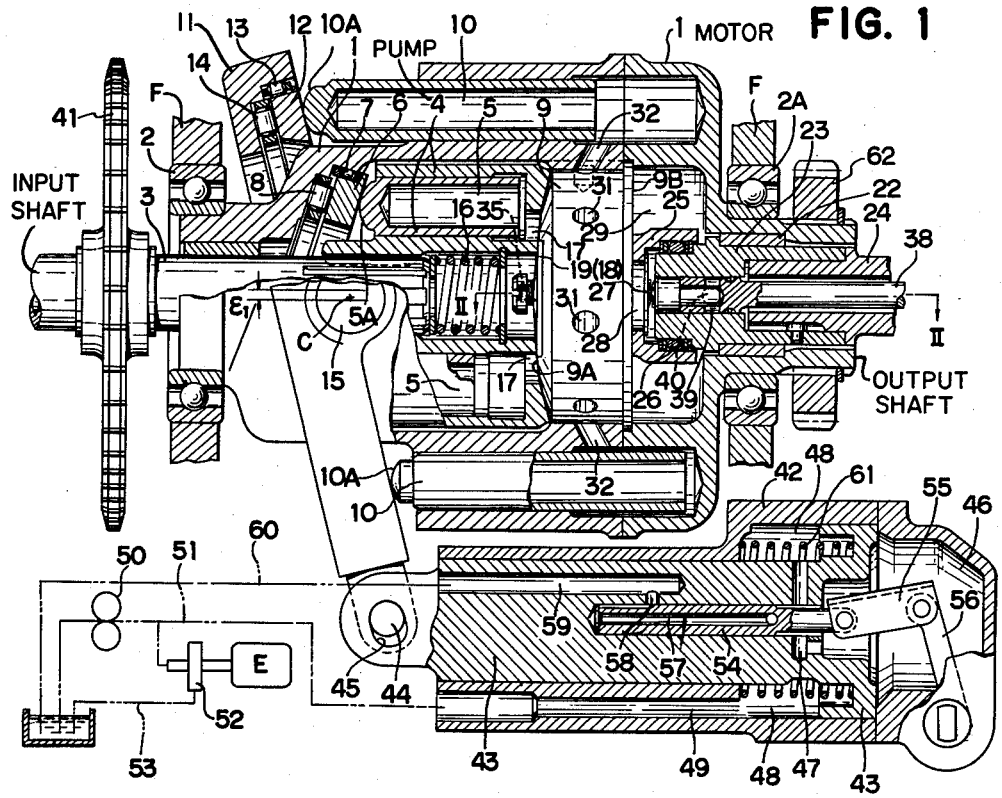
FIGURE 1 is a cross-sectional view of the controlling means comprising the instant invention.
Figure 2:
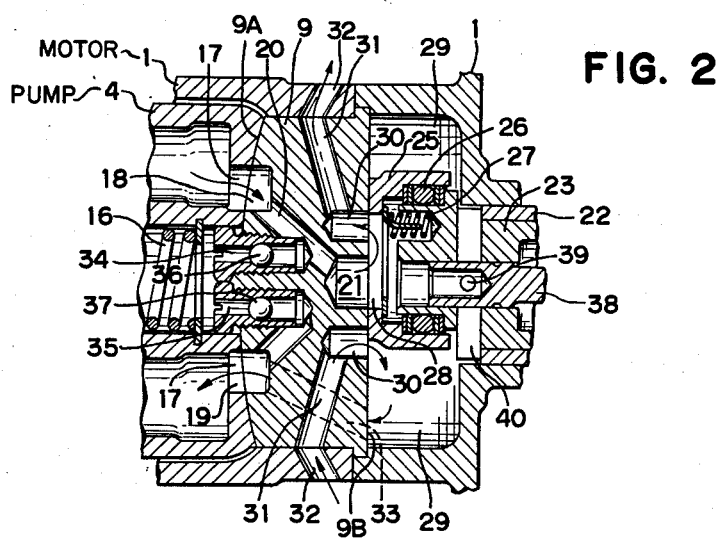
FIGURE 2 is a sectional view on line II—II of FIGURE 1.
Figure 3:
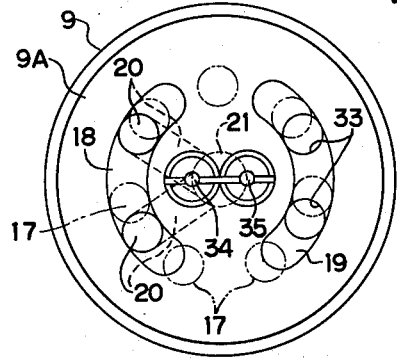
FIGURE 3 is a left hand side view of the swash plate.

A rotatable, variable displacement motor 1 is journalled in a fame F by bearings 2 and 2A. A shaft 3 and a rotatable, variable displacement pump 4 are splined to each other and mounted concentrically with motor 1. The pump is shaped like a cylinder, and has a plurality of pistons 5 placed therein. Spherical heads 5A of pistons 5 are in contact with a swash plate 6, which is rotatably mounted on bearings 7 and 8. A distributing plate 9 is secured to motor 1. The left hand surface of plate 9 is spherical surface 9A, with which the right hand side surface of pump 4 is in slidable watertight contact effected by spring 16.

Motor 1 has therein a plurality of pistons 10. The spherical heads 10A of pistons 10 are in contact with swash plate 12, rotatably mounted in supporting member 11 by bearings 13 and 14. The supporting member 11 is journalled on the frame F by trunnions 15. Fluid holes 17 are formed opposite each of the pistons 5. Spherical surface 9A is provided with an arc formed exhaust hole 18 and an arc formed suction hole 19. The exhaust hole 18 is connected to pressure fluid reservoir 21 by fluid passage 20. Reservoir 21 is concave, and is on the right hand side of plate 9. It readily can be seen that, upon rotation of shaft 3 and pump 4, that pistons 5 will be caused to reciprocate by swash plate 6, and holes 17 will in turn pass adjacent to holes 18 and 19 and communicate consecutively therewith.

A stationary cylindrical shaft 23 is mounted concentrically with motor 1, and is held by bearing 22. A branch tube 24 is rigidly connected to the frame F. At the left hand side of shaft 23, an elastic packing 26 holds a distributing ring 25 watertight. Ring 25 abuts the right hand side of plate 9, denoted 9B, and is urged by spring 27. This forms inner compartment 28 and outer compartment 29. Fluid holes 30 of equal number with pistons 10 are formed in surface 9B. Fluid passages 31 connect holes 30 and 32. Holes 32 communicate with the pistons 10. Fluid passages 33 are formed adjacent to the periphery of the surface 9B. Therefore, the outer compartment 29 communicates with the suction holes 19.

Figure 4:
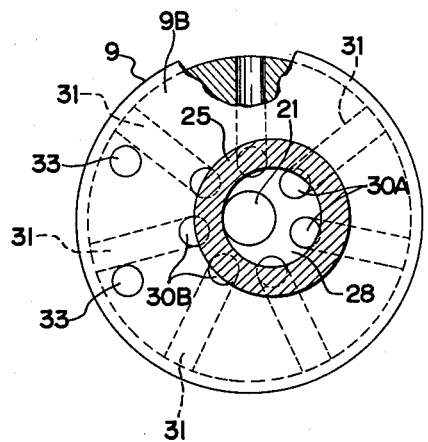
FIGURE 4 is a right hand side view of the swash plate.

The inner compartment 28 is always arranged to communicate with said pressure-fluid reservoir 21. Plate 9 is not rotated. The fluid holes 30A (FIG. 4) which are communicated with pistons 10 are opened to the compartment 28. The fluid under pressure which is discharged into the exhaust hole 18 by pistons 5 travels through inner compartment 28 and fluid passage 31 to piston 10 and forces the same against swash plate 12. If swash plate 12 is inclined off the vertical, the motor 1 rotates. At the same time, pistons 10 on the opposite side of motor 1 from those engaged in their suction strokes discharge fluid into passages 31 and thence to outer compartment 29. From there, it passes through fluid passage 33 to suction hole 19 and then is taken into pump 4 by the intake stroke of pistons 5. It readily can be seen that the ratio between shaft 3 and motor 1 can be varied merely by varying the angle of inclination af swash plate 12.

Fluid feeding passages 34 and 35 are connected with exhaust passage 18 and suction passage 19, and have therein reversing valves 36 and 37. The head portion of actuating lever 38 is inserted into shaft 23 with a watertight connection. Shaft 23 has a perforation 40, and when that is made coincident with perforation 39 by turning the lever 38, the inner compartment 28 is connected with the outer compartment 29 to separate the shaft 3 from the motor 1. The above-mentioned construction is a common design, save for the details.

As shown in FIGURE 1, the supporting frame 11, with swash plate 12, is mounted eccentrically to the shaft 3, pump 4, and motor 1. The center C of trunnion 15 is displaced downwardly on the drawing a distance E1 from the axis of shaft 3. In this case, the force exerted by pistons 10 on the upper half of supporting frame 11 and its lower half differs, and therefore the supporting frame 11 is subjected to a rotational force in a counterclockwise direction on the drawing. The magnitude of this force is approximately proportional to fluid pressure acting on the pistons 10, and in turn the fluid pressure is approximately proportional to the output torque of the prime mover E connected to the wheel 41 fastened on shaft 3 and to the load on the side of driven wheel 62. Therefore, the rotational moment acting upon supporting frame 11 is approximately proportional to output torque and load respectively.

This rotational moment is counteracted by a suitable control mechanism. A cylinder 42 is connected to the frame F. A piston 43 is positioned therein for axial movement to the right and to the left. A hole 45 at the end of piston 43 is placed over a pin 44 attached to the supporting frame 11. A fluid chamber 46 is formed within said cylinder, and this is connected to the outside of the cylinder by passages 47 and 49 and annular fluid chamber 48. Fluid is fed to passage 49 through a gear pump 50 and a tube 51. Upon the introduction of fluid into the cylinder under pressure, the piston 43 is urged to move to the left since the piston area open to chamber 46 is greater than that open to chamber 48. Between the tube 51 and prime mover E, an appropriate centrifugal controlling device 52 is provided for controlling the pressure of tube 51 so as to be approximately proportional to the rotational velocity of prime mover E. A fluid discharging device 53 is connected to 52.

A valve 54, having a passage 57 therein which is in communication with chambers 46 and 48, is movably mounted in piston 43. A ring 55 connects this valve to manual arm 56. Piston 43 has formed therein fluid passages 58 and 59 which, when the valve is moved to the right, come into communication with passage 57. Passage 59 is connected to a tube 60, and a balancing spring 61 urges the piston 43 to the right to balance the fluid pressure.

In operation, when the load on the driven side which is connected to driven wheel 62 is increased, the fluid pressure increases due to the resulting inertia on the side of the prime mover. When the output torque of the prime mover is increased, the fluid pressure increases due to the accompanying inertia on the driven side thereof (e.g. accelerating velocity resistance). Therefore, the rotational moment caused by the force generated by pistons 10 is increased and the supporting frame is caused to rotate in a counterclockwise direction. This, of course, varies the ratio between the input shaft 3 and the motor 1. At the same time, piston 43 is moved to the right. Eventually, the moment on supporting frame 11, the effect of spring 61, and the force created by the fluid acting upon piston 43 balance. At that point, the output torque of the driven wheel 62 is in equilibrium with the increased load on the driven side. Thus, then the output torque of the prime mover is smoothly accelerated. Also, with an increase of velocity, the driven side is smoothly accelerated. Further, when the rotary velocity of the prime mover is increased, the pump 4 is rotated at a faster rate, and the volume of fluid discharged from pistons 5 is increased. Therefore, the velocity of motor 1 also is increased.

The fluid pressure acting on controlling piston 43 is controlled by device 52, which renders the pressure approximately proportional to the rotating velocity of the prime mover. As a result, piston 43 is pushed to the left and the transmission ratio is reduced. Eventually, equilibrium is reached.

If the output torque, the load, or the rotational velocity is reduced, the operation of the invention is opposite to that related above. When the output torque, the load, and the rotational velocity are changed simultaneously, the operations described above are done in combination. The supporting frame 11 is automatically controlled to an angle reflecting each factor. Said combined operation is particularly effective when the apparatus of the present invention is employed for a land vehicle.

When arm 56 is operated, chambers 46 and 48 are connected to pipe 60 through passages 57, 58, and 59. The pressure in chambers 46 and 48 is reduced, the piston 43 is moved rapidly to the right, supporting frame 11 is rotated counterclockwise, and the transmission ratio, therefore, is radically changed. This brakes the engine, and is particularly effective when the prime mover is accelerated by causes from the driven side.

Figure 5:
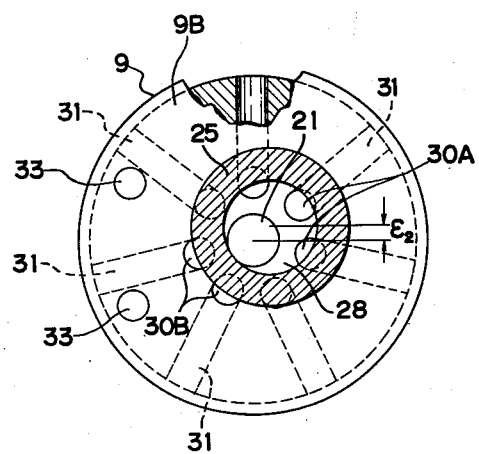
FIGURE 5 is a similar view of the swash plate with the distributing ring being shifted.

The distributing ring 25 may be mounted eccentrically to the shaft 3 a distance of E2, as shown in FIGURE 5. Thus, the average number of pistons 10 driven by the fluid from chamber 28 is greater above the trunnion 15, which in this embodiment is mounted concentrically to the shaft 3, than below it. This imbalance produces the same result as that produced by eccentrically mounting supporting frame 11.

In another embodiment, supporting frame 11 and swash plate 12 can be made stationary, and swash plate 6 can be made rotatable. In that event, the described invention can be applied to swash plate 6.

While there has been illustrated and described certain embodiments, various modifications may obviously be made without departing from the pure spirit and scope of the invention which we intend to have defined only by the appended claims taken with all reasonable equivalents.

We claim:

1. A pressure fluid transmission gear having fluid under pressure therein, comprising a rotatable variable displacement pump mounted upon a shaft which is adapted to be attached to a prime mover, a rotatable motor of the variable displacement type mounted concentrically with said pump and adapted to be attached to a driven member, an element for changing the displacement of said motor mounted for rotation in a clockwise and counterclockwise direction on an axis perpendicular to the axis of said shaft and eccentric to the axis of rotation of said pump and said motor, whereby when the output torque or the load is changed, thereby changing the pressure of the fluid, the force exerted upon the said element is changed, thereby causing it to rotate, and further comprising a force exerting means responsive to engine speed attached to said element in such a way that it exerts force controlling movements of the said member caused by the variations in output torque or load.

2. A pressure fluid transmission gear according to claim 1 in which the force exerting means comprises a cylinder, a piston mounted in said cylinder for axial movement to the left and to the right, said piston being attached to said element and being adapted to receive fluid of a pressure proportional to the speed of the prime mover, which fluid acts upon said piston to urge it to the left, and a spring mounted on said piston urging movement of the same to the right.

3. A pressure fluid transmission gear according to claim 2 which further includes a manually operable valve mounted in said piston which is adapted to reduce the fluid pressure acting on said piston, whereby the prime mover is braked.

4. A pressure fluid transmission gear having fluid under pressure therein, comprising a rotatable variable displacement pump mounted upon a shaft which is adapted to be attached to a prime mover, a rotatable motor of the variable displacement type mounted concentrically with respect to the axis of rotation of said pump and adapted to be attached to a driven member, an element for changing the displacement of said motor mounted for rotation in a clockwise and counterclockwise direction on an axis perpendicular to the axis of said shaft, a distribution plate mounted adjacent to said pump and said motor, each of which have a plurality of pistons mounted therein, in such a manner that a greater number of motor pistons above the shaft are driven by the discharged fluid from the pump than motor pistons below the shaft, whereby when the output torque or the load is changed, thereby changing the pressure of the fluid, the force exerted upon the said element is changed, thereby causing it to rotate, and further comprising a force exerting means responsive to engine speed attached to said member in such a way that it exerts force controlling movements of the said element caused by the variations in output torque or load.

5. A pressure fluid transmission gear according to claim 4 in which the force exerting means comprises a cylinder, a piston mounted in said cylinder for axial movement to the left and to the right, said piston being attached to said element and being adapted to receive pressure fluid which is of a pressure proportional to the speed of the prime mover, which fluid acts upon said piston to urge it to the left, and a spring mounted on said piston urging movement of the same to the right.

6. A pressure fluid transmission gear according to claim 5 which further includes a manually operable valve mounted in said piston which is adapted to reduce the fluid pressure acting on said piston, whereby the prime mover is braked.

(References on following page)

References Cited by the Examiner

UNITED STATES PATENTS

| | | | |
|---|---|---|---|
| 2,257,724 | 10/41 | Bennetch | 60—53 |
| 2,382,027 | 8/45 | Rose | 60—53 |
| 2,452,704 | 11/48 | Wahlmark | 60—53 |
| 2,803,112 | 8/57 | Sadler | 60—53 |
| 3,054,263 | 9/62 | Budzich | 60—53 |
| 3,123,975 | 3/64 | Ebert | 60—53 |

JULIUS E. WEST, *Primary Examiner.*

EDGAR W. GEOGHEGAN, *Examiner.*